US008437266B2

(12) United States Patent
Steiner (10) Patent No.: US 8,437,266 B2
(45) Date of Patent: May 7, 2013

(54) FLOW THROUGH CALL CONTROL

(75) Inventor: Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 629 days.

(21) Appl. No.: 12/547,957

(22) Filed: Aug. 26, 2009

(65) Prior Publication Data

US 2011/0051605 A1  Mar. 3, 2011

(51) Int. Cl.
*H04L 12/56* (2006.01)
*H04L 12/16* (2006.01)
*H04L 12/66* (2006.01)

(52) U.S. Cl.
USPC ............ 370/252; 370/260; 370/352; 370/428

(58) Field of Classification Search ............... 370/252, 370/260, 352, 353–356, 474, 428–429, 261–265
See application file for complete search history.

(56) References Cited

U.S. PATENT DOCUMENTS

| | | | |
|---|---|---|---|
| 5,862,519 A | 1/1999 | Sharma et al. | |
| 7,061,871 B2 * | 6/2006 | Sheldon et al. | 370/242 |
| 7,516,198 B1 * | 4/2009 | Appala et al. | 709/219 |
| 7,822,837 B1 * | 10/2010 | Urban et al. | 709/223 |
| 7,843,843 B1 * | 11/2010 | Papp et al. | 370/252 |
| 7,843,939 B2 * | 11/2010 | Butler et al. | 370/395.3 |
| 7,844,293 B2 * | 11/2010 | Sung et al. | 455/518 |
| 7,864,693 B2 * | 1/2011 | Burman et al. | 370/252 |
| 7,936,694 B2 * | 5/2011 | Choudhury | 370/252 |
| 8,031,601 B2 * | 10/2011 | Feroz et al. | 370/232 |
| 8,060,645 B1 * | 11/2011 | Catania | 709/234 |
| 2002/0087579 A1 | 7/2002 | Chasanoff et al. | |
| 2003/0048388 A1 * | 3/2003 | Lewis et al. | 348/720 |
| 2005/0033840 A1 * | 2/2005 | Nisani et al. | 709/224 |
| 2005/0060420 A1 * | 3/2005 | Kovacevic | 709/231 |
| 2005/0180341 A1 * | 8/2005 | Nelson et al. | 370/260 |
| 2005/0259946 A1 * | 11/2005 | Kitamura | 386/46 |
| 2005/0283752 A1 | 12/2005 | Fruchter et al. | |
| 2007/0033003 A1 | 2/2007 | Morris | |
| 2007/0081562 A1 * | 4/2007 | Ma | 370/516 |
| 2007/0299838 A1 | 12/2007 | Behrens et al. | |
| 2008/0188966 A1 * | 8/2008 | Sutardja et al. | 700/94 |

* cited by examiner

*Primary Examiner* — Kwang B Yao
*Assistant Examiner* — Candal Elpenord
(74) *Attorney, Agent, or Firm* — Sheridan Ross P.C.

(57) ABSTRACT

Methods, systems, and devices are provided that propose interlacing an RTP communication with a tag that is used to identify the RTP communication within a continuous group or stream of many other RTP communications and other call control communications. The tags can be used for post processing of the RTP communication, thereby obviating the need for real-time processing of the RTP communication. This helps reduce latency in systems that are trying to control the RTP stream for various reasons. Furthermore, temporal relationships between RTP communications and other associated data streams becomes much easier to manage.

13 Claims, 6 Drawing Sheets

FLOW THROUGH CALL CONTROL

FIELD

The present invention is directed generally to communications and more particularly to call and communications recording mechanisms.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day Automated Contact Distributors (ACDs) when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Many existing contact centers have a need to record agent activity, or at least the activity of a contact center agent's work station, to help monitor and analyze the efficiency of the agent. Unfortunately, in many communication protocols, call control of media streams requires multiple controllers. As an example, the simple act of recording a media stream in SIP requires many resources, each of which are required to communicate with one another to synchronize the call recording process. The synchronization utilizes important network bandwidth due to the exchange of messages and also introduces latency into the transmission of the media stream and/or introduces delays into the controls, both of which are not desirable. An additional complication is that each desired media stream is traditionally recorded as two or more separate files, thereby limiting the streaming rate to disk and further increasing latency and disk fragmentation.

SUMMARY

It is thus one aspect of the present invention to provide a mechanism continuously recording data packets transmitted from a communication device, where the data packets are including in a communication stream and the communication stream includes a plurality of different communications. In accordance with at least some embodiments of the present invention, a mechanism is provided for tagging a communication, such as a Real-time Transport Protocol (RTP) communication, with control commands. The RTP communication can be one of many communications included in the communication stream. More specifically, a communication stream transmitted by a single communication device may include an RTP communication, a set of packets containing call control information, a set of packets used to negotiate the parameters of the RTP communication, and/or a set of packets for discontinuing the RTP communication.

The communication stream may also include packets that are being transmitted to other communication devices. As an example, a contact center agent may be conducting a real-time communication session with a customer which involves the use of an RTP communication and a set of control packets used in connection with that RTP communication. During that communication session the contact center agent may also send packets to another communication device (e.g., query a web server or database for additional information to help in servicing the customer). The contact center agent may also establish a conference call with an expert agent. These additional communications may be included in the communication stream transmitted from the communication device (or possibly received at the communication device), but may also be identified is separate and independent communications.

Each of the different communications may be stored contiguously in a single communication stream, and each communication has tags assigned thereto that can be referenced during post-processing of the communication stream. This allows the entire communication stream to be written continuously to its target. The tags provided for a particular communication (e.g., an RTP communication) may identify the source and destination IP addresses for the RTP communication as well as the length of the RTP communication. When a new RTP communication is received (e.g., a new communication session is established with a new communication device), the new communication will have a different tag, thereby allowing the post processing mechanism to differentiate between RTP communications.

In accordance with at least some embodiments of the present invention, the tag may be a hash of the source and destination IP address as well as the connection time identified in a time stamp. This results in a virtually unique hash that can be used to identify and quickly retrieve the RTP stream from its data store. The virtually unique has may be used as a unique identifier of the communication.

In addition to containing identification information, the tag may also include post processing information. The tag will indicate what post processing steps are to be performed on the associated communication. In operation RTP communications are received from a User Agent (UA). There the RTP communications can be split such that a copy of each is sent to a stream record location as well as its intended target. The communication stream is stored as a continuous file with no seeks and is interlaced with tags as appropriate. When post processing on the RTP communication is desired, the RTP communication is retrieved from its storage location and the tag information is used to determine what sort of post processing steps are required.

Prior art systems require processing of RTP communications on the front end, before storage. Embodiments of the present invention propose interlacing each RTP communication and other communications within a communication stream with a tag that is used to identify the RTP communication within a continuous group of many RTP communications and other communications and then apply the necessary post processing to the RTP communication. This helps reduce latency in systems that are trying to control the RTP communication for various reasons. This solution can record not only the RTP communication but the associated data stream (SIP messaging, Agent messaging, etc) as separate communications and maintain temporal relationships without complex clock synchronization functionality.

Moreover, the stream can be split and control/routing and resource management decisions can be made at "wire-speed", allowing a whole new host of services and functionality within the same infrastructure.

In accordance with at least some embodiments of the present invention, a minimal amount of processing may be performed on a communication stream before it is stored in a continuous segment. More specifically, filtering rules may be applied to the communication stream that limits the amount of data sent to storage. As an example, filtering rules may be applied whereby communications of interest are recorded and stored in their entirety whereas non-interesting communications (e.g., Internet activity, SMS messages, Instant Messages (IMs), etc.) are not recorded in their entirety. Rather, only a portion of such a communication may be recorded and stored in an attempt to reduce the amount of memory consumption at the data store. As another example, the entirety of a non-interesting communication may be discarded without ever being recorded or stored.

In accordance with at least some embodiments of the present invention a method is provided that generally comprises:

receiving a first communication as a part of a media stream;

analyzing the first communication to determine attributes of the first communication;

assigning the first communication a first unique identifier;

receiving a second communication as part of the media stream, wherein the second communication is received immediately after the first communication;

analyzing the second communication to determine attributes of the second communication;

assigning the second communication a second unique identifier different from the first unique identifier;

storing the first and second unique identifiers such that the attributes of the first and second communications can be identified in the future; and causing the first and second communication to be recorded in a continuous segment of memory.

Another embodiment of the present invention provides a method that generally comprises:

receiving a first set of packets containing call control information;

analyzing the first set of packets to determine attributes of the call control information;

assigning the first set of packets a tag including a first unique identifier;

receiving a second set of packets comprising voice or video data being transmitted from a first communication device to a second communication device during a real-time communication session;

analyzing the second set of packets to determine a type of encoding scheme being used to encode the voice or video data;

assigning the second set of packets a tag including a second unique identifier as well as the determined type of encoding scheme used to encode the voice or video data;

storing the first and second tags; and causing the first and second sets of packets to be recorded in a continuous segment of memory.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any computing application in which it is desirable to efficiently record large amounts of streaming data.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
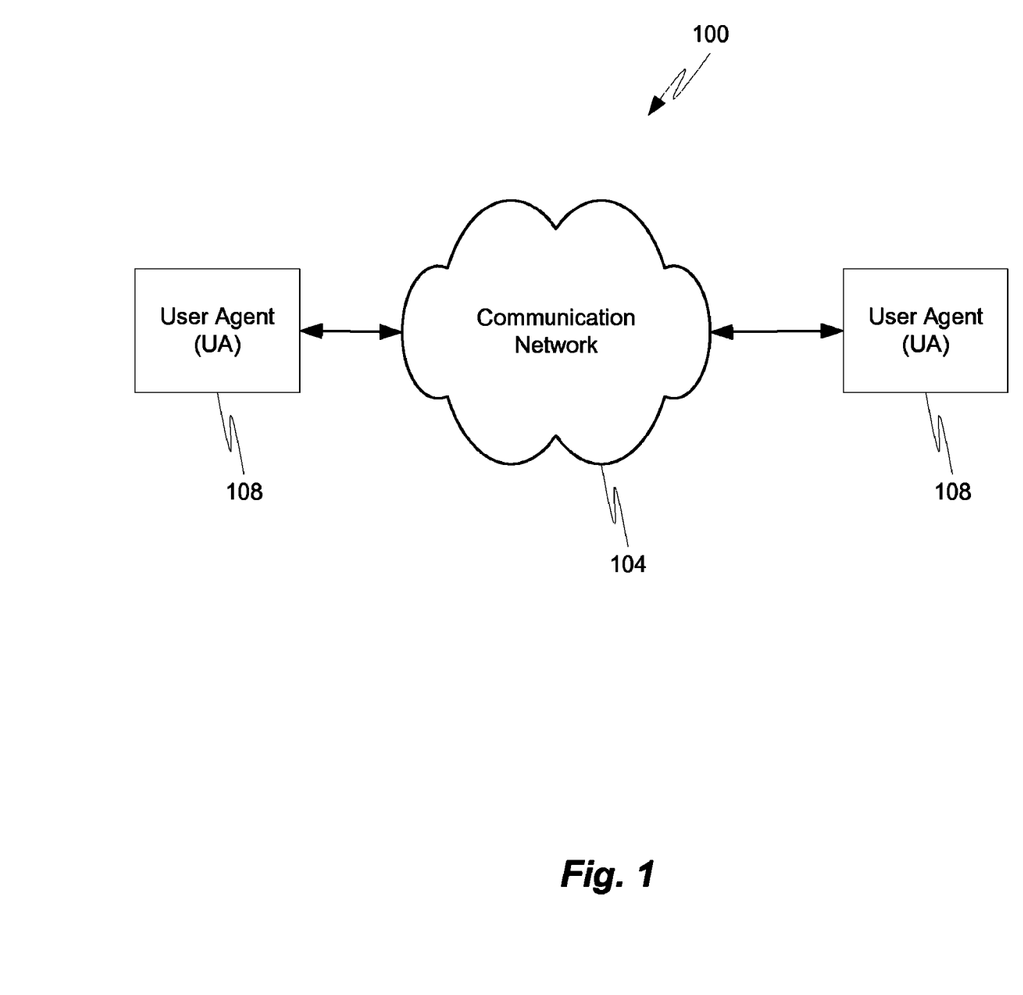
FIG. 1 is a block diagram depicting a communication system in accordance with embodiments of the present invention.

FIG. 1 shows an illustrative embodiment of a communication system 100 in accordance with at least some embodiments of the present invention. The communication system 100 generally comprises a communication network 104 connecting two or more User Agents (UAs) 108.

The communication network 104 may comprise any type of known communication medium or collection of communication mediums and may use any type of protocols to transport messages between UAs 108. The communication network 104 may include wired and/or wireless communication technologies. The Internet is an example of the communication network 104 that constitutes and IP network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication mediums such as coaxial cable, copper cable/wire, fiber-optic cable, antennas for transmitting/receiving wireless messages, and combinations thereof.

The UAs 108 may correspond to communication devices or endpoints used by human users or automated users. Examples of a suitable UA 108 include, but are not limited to, a personal computer, laptop, Personal Digital Assistant (PDA), cellular phone, smart phone, telephone, mobile email retrieval device, Interactive Voice Response (IVR) units, servers, or combinations thereof. In general, a number of communication devices may be associated with a single user and provisioned rules may be employed to intelligently route communications to/from the multiple communication endpoints of the user. In other embodiments, the UAs 108 may comprise work stations employed by contact center personnel in a contact center. A single work station may be used by one or more contact center agents, although not necessarily at the same time. In other words, a work station may be shared among two or more contact center agents and those agents may access the resources of the work station by logging in to the work station with appropriate credentials.

Figure 2:
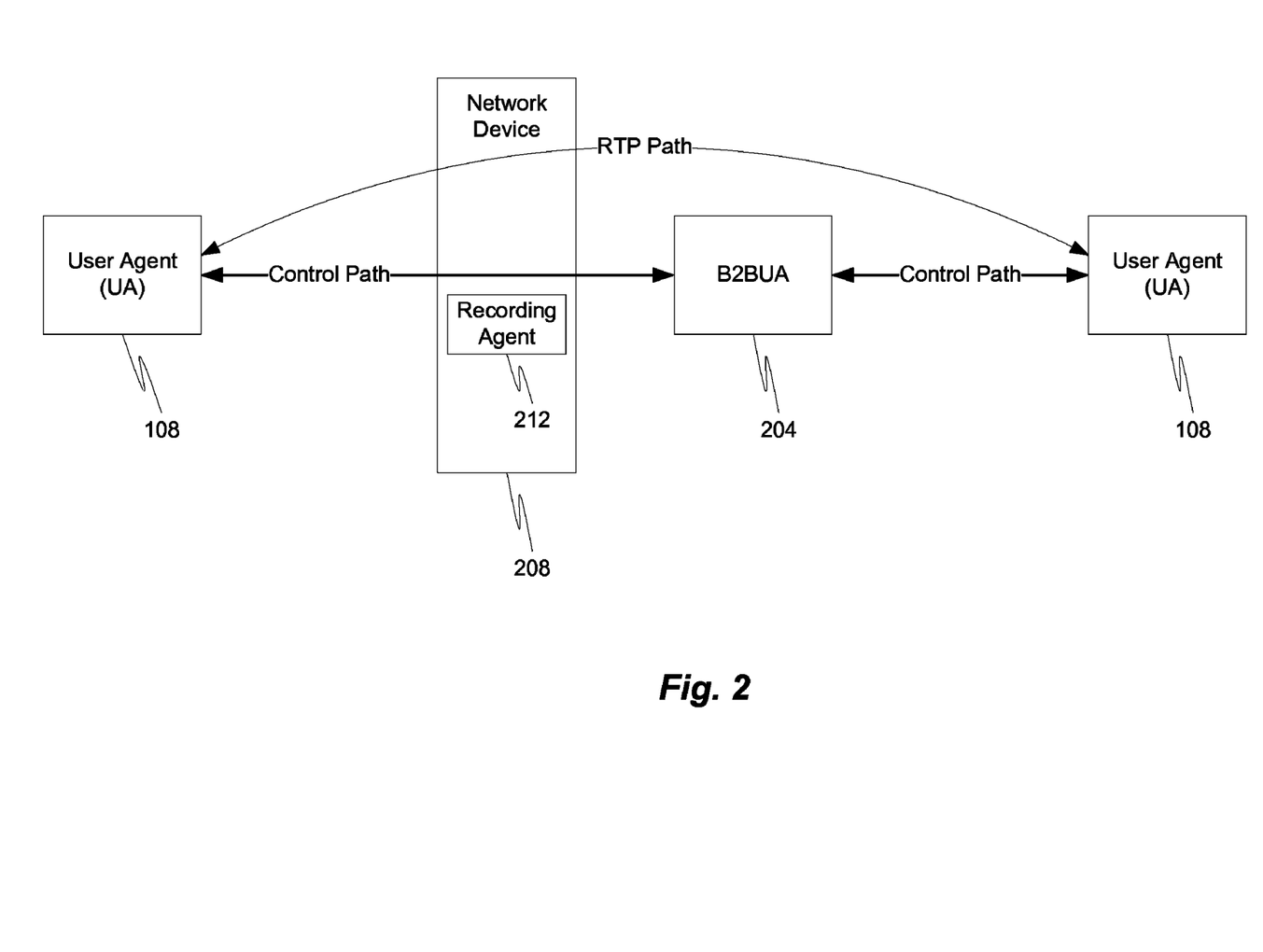
FIG. 2 is a block diagram depicting further details of a communication system in accordance with embodiments of the present invention.

Referring now to FIG. 2, additional details of a communication system will be described in accordance with at least some embodiments of the present invention. The communication path between UAs 108 generally traverses one or more intra-network elements or devices 208 (i.e, non-endpoint devices). Examples of such devices include routers, proxies, firewalls, servers, etc. Due to the nature of SIP and other related communication protocols there is a relatively high likelihood that some communications originating from a first communication endpoint, such as a UA 108, traverse a network device whereas other communications originating from the same communication endpoint do not traverse that network device. Consider, for example, a Back-to-Back UA (B2BUA) 204 that resides between two UAs 108. Call control signals are generally transmitted from one UA 108 to the other UA 108 through the B2BUA 204. Thus, the B2BUA 204 would be a possible location for implementing call control recording functionality. However, the B2BUA 204 is generally not in the RTP media path established between the UAs 108. Accordingly, the B2BUA 204 will not be able to record the RTP communications between the UAs 108. This is problematic if it is desired to correlate the recordings of the call control signals against the recordings of the RTP communications.

In accordance with at least some embodiments of the present invention a network device 208 is provided between the UAs 108. The network device 208 is positioned such that both the control signals and the RTP communications, as well as other communications originating from the first UA 108, traverse the network device 208. Some examples of a suitable network device 208 include, without limitation, a router, a firewall, a Session Border Controller (SBC), or the. Alternatively, the network device 208 may be incorporated into the UA 108 or may be a functioning part of the UA 108. In some embodiments, a recording agent 212 may reside in the network device 208 enabling the network device 208 to monitor and record all communications (including media and non-media communications) originating from and terminating at a particular UA 108. In other embodiments, the recording agent 212 may reside on a UA 108 such that all actions or network interactions of the UA 108 are capable of being recorded.

Figure 3:
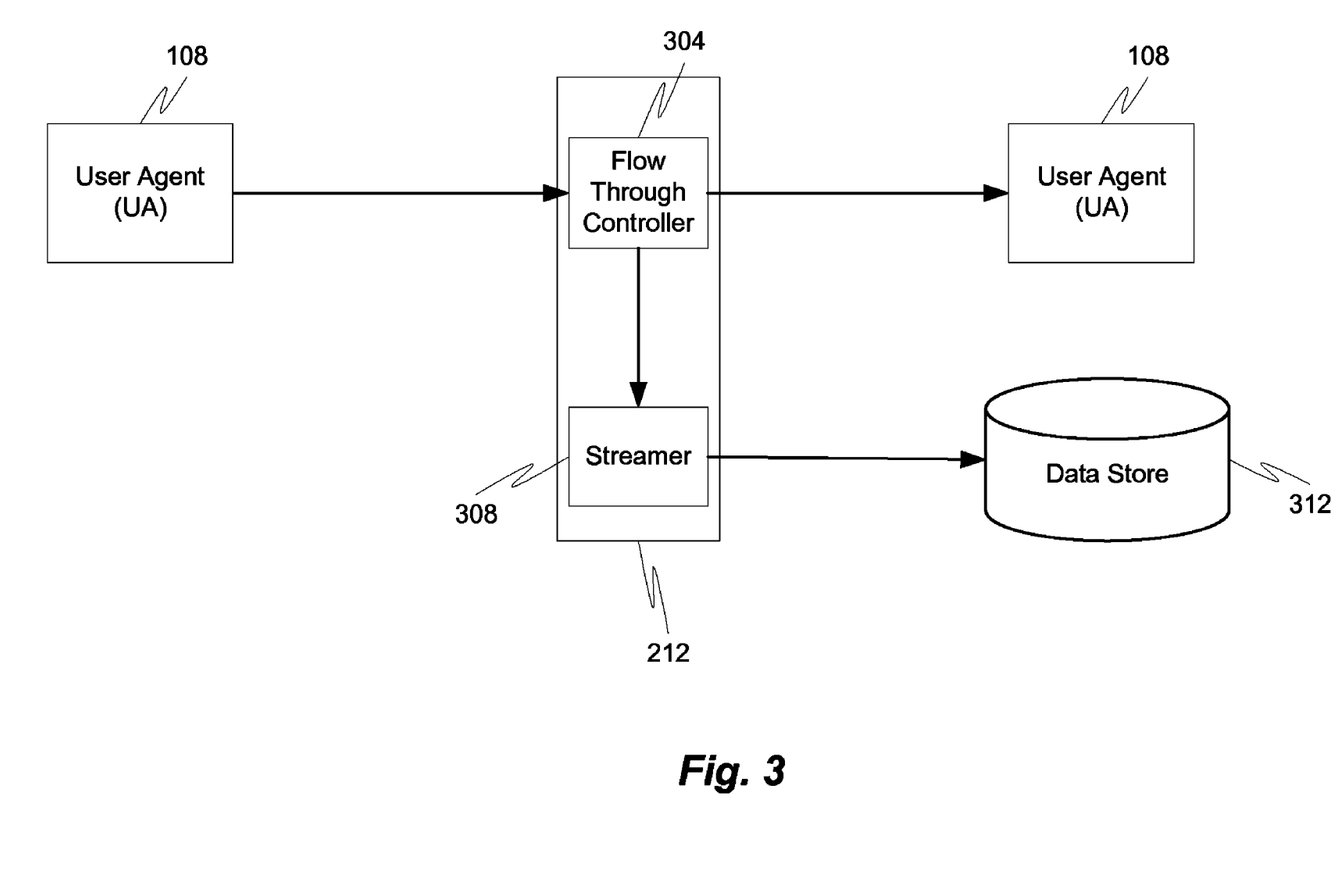
FIG. 3 is a block diagram depicting components of a call recording agent in accordance with embodiments of the present invention.

Referring now to FIG. 3, additional details of a recording agent 212 will be described in accordance with at least some embodiments of the present invention. The recording agent 212 may comprise a flow through controller 304 and a streamer 308. The flow through controller 212 is responsible for splitting the data stream (including SIP control communications, RTP communications, and any other packet-based communications) thereby allowing a copy of the stream to continue to the target device, such as a target UA 108. The flow through controller 304 also creates a second copy of the data stream which is transmitted to a stream 308.

In accordance with at least some embodiments of the present invention, the flow through controller 304 is also responsible for analyzing the data stream at a relatively high level (e.g., the flow through controller 304 does not perform an in-depth analysis of the data stream to facilitate immediate call control). This initial analysis is primarily used to identify different communications within the data stream, retrieve characteristic data from each communication, and determine a unique identifier that can be used to identify and retrieve the communication at a later point in time. Characteristic data determined for each communication may include, without limitation, the type of communication including whether it is a voice communication, a video communication, a call control communication, an IP data communication, an IPSec communication, a UDP/TCP/TLS communication, an RTP communication, or the like. Characteristic data may also include the length of the communication either in terms of packet numbers or memory size, when the communication was transmitted or received, whether the communication was encoded, how the communication was encoded, how to decode the communication, the address of the originating UA 108, the address of the target UA 108, whether the communication was a conference between three or more participants, and any other descriptor information The flow through controller 304 is performing all of its basic analysis in real-time such that the communications between the UAs 108 are not impeded or significantly delayed. The flow through controller 304 does not generally provide the capability to control the data stream as it is being transmitted although such a capability may also be built in to the recording agent 212. Rather, the flow through controller 304 provides a copy of the data stream to the stream 308 along with the characteristic information that was obtained during the analysis of communications within the data stream. The streamer 308 is adapted to apply a tag to the data stream such that the separate communications within the data stream can be retrieved and manipulated at a later point in time.

In some embodiments the streamer 308 may also be adapted to apply recording filters or filter rule sets to the data stream. When the streamer 308 applies a filter to the data stream the streamer 308 may decide not to record certain portions of the data stream in an effort to manage memory consumption. In some embodiments, the streamer 308 may be configured only to record certain types of communications. In other embodiments, the streamer 308 may be configured only to record certain communications between certain parties or only communications between a call center agent and a customer (e.g., not record internal or intra-enterprise communications or IP communications to web servers).

The streamer 308 applies the filters in an attempt to minimize the amount of data which is ultimately stored in the data store 312.

In accordance with at least some embodiments of the present invention, the data store 312 may be external to the network device 208 or the UA 108. In other embodiments, the data store 312 may be internal to the network device 208 or the UA 108. Regardless of location, the memory space in the data store 212 may be somewhat limited. This increases the usefulness of applying a recording filter at the streamer 308.

When the streamer 308 has applied the tag(s) to a communication within a data stream, that portion of the data stream (i.e., the packets belonging to the communication that has just been tagged) is sent to the data store for storage 312. The streamer 308 also causes the tag information to be stored in the data store 312 at an inventory location, possibly separate from the location where the packets of the communication have been stored. This separate storage of the tags may facilitate an efficient retrieval of the communications from the data store 312 at a later point in time. In some embodiments it may be desirable to retrieve and manipulate communications from the data store 312 after the communication has been recorded and possibly after the communication session between the UAs 108 has ended. As one non-limiting example, it may be desirable in a contact center environment to record the activities of all contact center agents when they interact with customers. The recorded interactions can then be accessed at a later point in time to identify dialog transcription, detection of emotion, agent trends, generate agent efficiency reports, or perform some other post-hoc analysis of the agent's interaction with customers.

The communications stored in the data store 312 may reside there for a predetermined amount of time after which they may be automatically deleted, thereby making room for the storage of new communications. The predetermined amount of time during which a communication is kept in the data store 312 may also be identified in the tags that are stored with the communication (e.g., as an expiration time or an expiration duration coupled with a storage timestamp). Before the communication is deleted, however, it is possible to retrieve and manipulate the communications on an as-needed basis since each communication is also stored along with information that can be used to determine how to decode a communication and manipulate said communication.

In accordance with at least some embodiments, it may be desirable to maintain all communications indefinitely and simply replace storage media at the data store 312 when they have reached their storage capacity. The full storage media may then be stored at a location remote from the data store 312. Advantageously, however, the storage media may still contain the packets of a communication along with its tag(s), which can be used to retrieve and decode the communication, if necessary.

Figure 4:
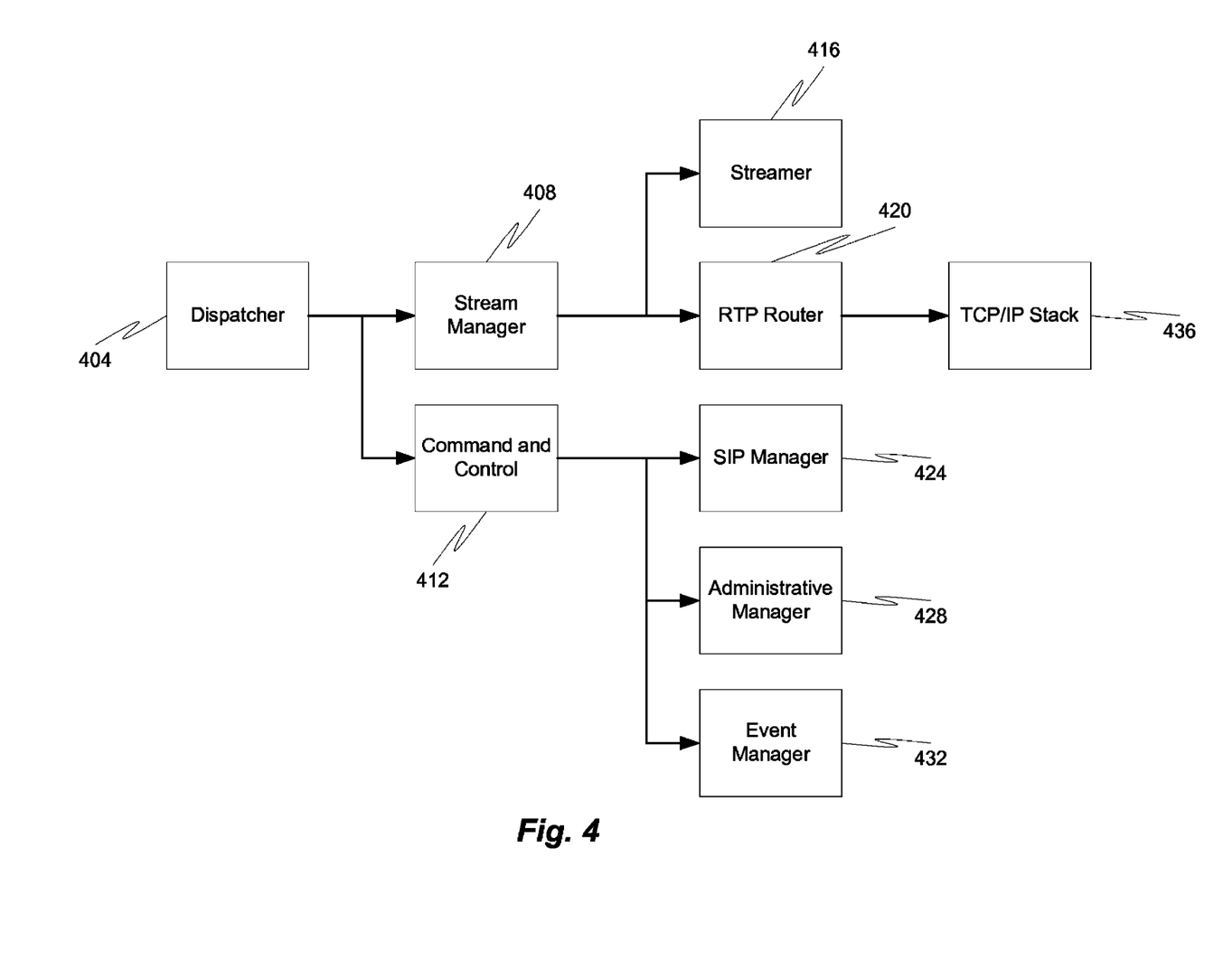
FIG. 4 is a block diagram depicting additional components of a call recording agent in accordance with embodiments of the present invention.

With reference now to FIG. 4, further details of a recording agent 212 will be described in accordance with at least some embodiments of the present invention. The recording agent 212 may include a dispatcher 404, a stream manager 408, a command and control module 412, a streamer 416, an RTP router 420, a SIP manager 424, an administrative manager 428, an event manager 432, and a TCP/IP stack module 436.

The dispatcher 404 may be a module contained within the flow through controller 304 which is responsible for identifying a communication type within a data stream and forwarding the communication, once its type has been determined, to the appropriate modules within the recording agent 212. As one example, the dispatcher 404 may send RTP and any other real-time media packets to the stream manager 408 whereas the dispatcher 404 may send command and control packets to the command and control module 412. Regular TCP/IP packets may also be sent to the stream manager 408.

The stream manager 408 may be adapted to split the media received at the recording agent 212 into two media streams. The first media stream may be provided to an RTP router 420 or similar routing mechanism which is capable of routing the packets toward their intended destination (e.g., the target UA 108). After the RTP router 420 has determined the appropriate routing information for the packets, the packets are provided to the TCP/IP stack 436 where they are formatted for transmission across the communication network 104 and then send across the communication network 104 on their way to their intended destination.

The other fork of the media stream (e.g., a copy of the packets sent through the RTP router 420 may be provided to the streamer 416 and processed as discussed above. The streamer 416 may be similar or identical to the streamer 308 discussed above.

The packets that have been identified as command and control communications are transmitted by the dispatcher 404 to the command and control module 412 where they are analyzed to determine, with further accuracy, the type of command and control packet that has been received. SIP command and control packets are sent to the SIP manager 424. Administrative command and control packets (e.g., SNMP packets or the like) are sent to the administrative manager 428. Any other event notification-type packet is sent to the event manager 432.

Each of these sub-modules further analyzes the packets to determine characteristics of the packets/communication for inclusion in the tags that will ultimately be stored in association with the communication. These modules may also implement any control logic based on the contents of the control signals or forward the control signals to another device which will be responsible for executing said control commands. After a suitable amount of analysis has been performed and the necessary actions have been taken in conformity with the contents of the command and control packets, the sub-modules 424, 428, 432 are adapted to forward the command and control packets/communications or copies thereof to the streamer 308 for tagging and storage in the data store 312. Accordingly, although not depicted, the SIP manager 424, administrative manager 428, and event manager 432 may be integral to the flow through controller 304.

Figure 5:
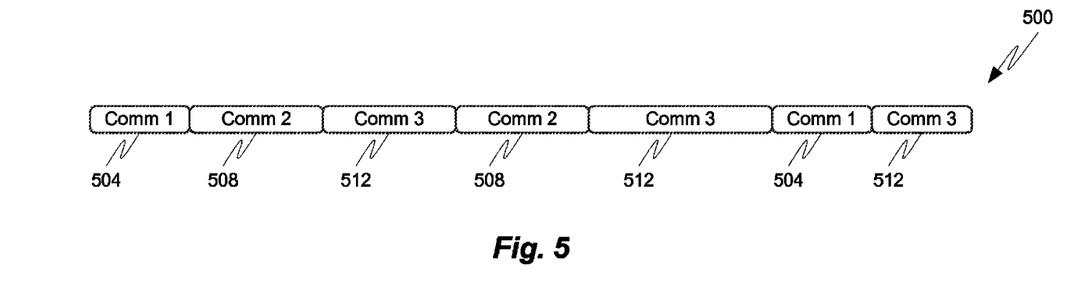
FIG. 5 is a block diagram depicting a logical representation of a communication stream in accordance with embodiments of the present invention.

With reference now to FIG. 5, an exemplary data stream 500 including a plurality of different communications 504, 508, 512 will be described in accordance with at least some embodiments of the present invention. Although the data stream 500 is only depicted as having three different communications, one skilled in the art will appreciate that any data stream emanating from or terminating at a UA 108 may include a greater or lesser number of communications depending upon the capabilities of the UA 108 and the way in which the UA 108 is being employed. As an example, the first communication 504 may correspond to SIP call controls communications transmitted from a first UA 108. The second communication 508 may correspond to the RTP media packets shared between UAs 108 during a communication session. The third communication 512 may correspond to traditional TCP/IP packets transmitted to and received from web servers while a contact center agent is viewing documents over the Internet.

Each of the communications 504, 508, 512 may include one or more packets for facilitating the IP communications over the communication network 104. Furthermore, each of the communications may be intermingled throughout the data stream as the user of the UA 108 may be simultaneously conducting a communication session while also viewing documents over the Internet. Therefore, it is necessary to identify communications within the data stream and after a new communication has been identified, continue to search the data stream for subsequent packets also belonging to the communication so that like communications can be marked with like identifiers or tags. This is also useful for post-recording processing since each of the packets belonging to a particular communication may be spread out across a data stream it will be necessary to rebuild the communication by retrieving all portions of the communication. This can be done by referencing the common unique identifier assigned to that communication and tagged to each packet or set of packets belonging to the communication.

Figure 6:
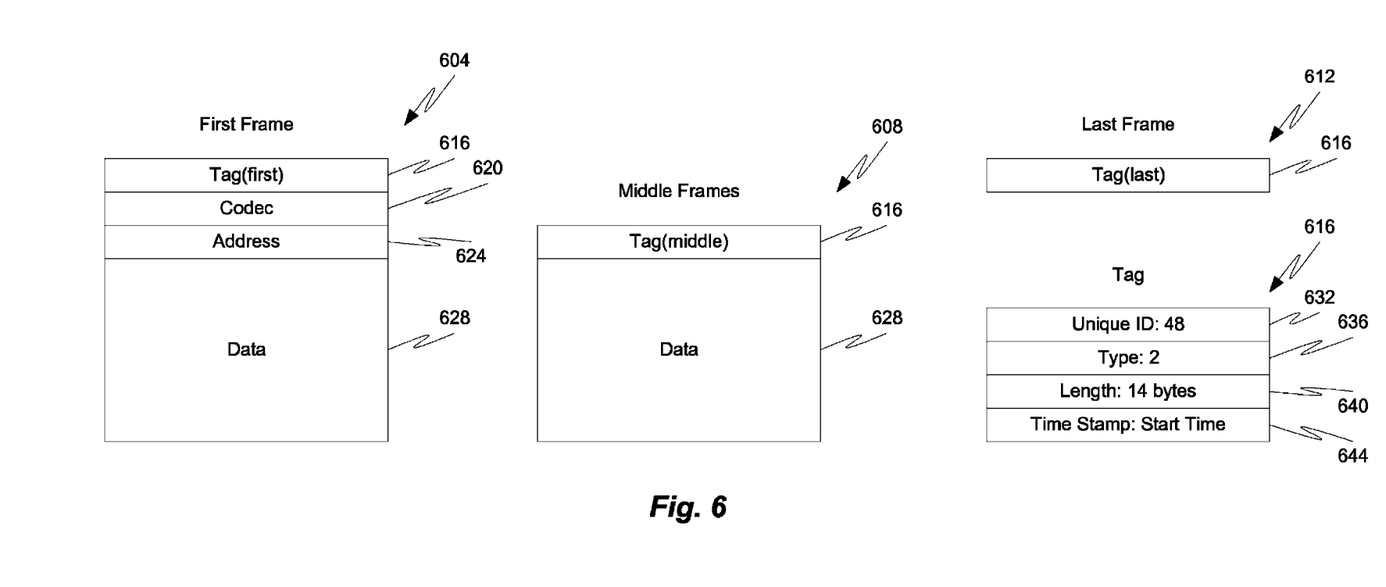
FIG. 6 is a block diagram depicting a series of data structures employed in accordance with embodiments of the present invention.

With reference now to FIG. 6, an exemplary set of data structures will be described in accordance with at least some embodiments of the present invention. As noted above, a single communication may be split up within a single data stream into multiple but separate packets sets. These packets sets or frames will each be tagged with a similar tag thereby indicating the relationship between packets. As one example, the first set of packets 604 received in a new communication may be assigned a tag 616. The first set of packets 604 may also include encoding/decoding information 620 to help identify the type of communication and further help identify how to decode the packets during post-recording processing. The first set of packets 604 may further include an address field 624 for storing one or more addresses used to define the communication (e.g., sending and/or receiving party). The first set of packets 604 may also include a data field 628 where the actual payload of the first set of packets is stored. Any subsequently transmitted packets also belonging to the first communication may be identified by one or more of the sending/receiving party, the communication type, and any other communication characteristic that can uniquely identify the communication among a number of different communications.

A second set of packets 608 may also be tagged when stored with a communication tag 616. Again, the communication tag 616 of the second set of packets 608 may be the same as the tag stored in connection with the first set of packets 604 if both sets of packets belong to the same communication. The last set of packets 612 may correspond to the final packet or set of packets within a communication. This can usually be identified by detecting a control/command signal some time after the last communication, where the control/command signal indicates a destruction of the communication link established between a UA 108 and some other communication device. Again, the last set of packets 612 may be stored with a tag 616 in a similar fashion to preceding sets of packets belonging to the same communication.

As can be seen in FIG. 6, each tag 616 stored with a set of packets belonging to a particular communication may have one or more fields used to retrieve the stored set of packets belonging to a common communication, assemble the packets together into a coherent communication (i.e., sequentially according to the order in which they were initially transmitted), as well as process the stored set of packets as a collective and single communication. The types of processes that may be performed on the communication after it has been stored include, but are not limited to, replaying the recorded version of the communication, analyzing the content of the communication, editing the communication, retrieving contact center agent performance metrics from the communication, transcribing the recording, and so on. The types of fields that may be included in the tags 616 to facilitate this post-recording processing include, but are not limited to, a unique identifier field 632 for storing a unique identifier 632 that has been assigned to the communication.

The tag 616 may also include a communication type field 636 for storing information related to the type of communication. The type field 636 may also include information used for decoding the communication. More specifically, the type of communication may be an indicator used to determine how to decode the communication.

The tag 616 may further include a frame length field 640 for storing the size of data 628 stored for a particular frame. The size may be identified as either a number of packets or number of bits/bytes.

The tag 616 may also include a time stamp field 644 for storing one or more of a transmission time of the first packet in the set of packets, a receipt time, an elapsed time since the communication started, or some other indicator of when the set of packets in a communication was received. Advantageously, the time provided in the time stamp field 644 does not necessarily need to be universally accurate since all communications are stored contiguously as they were transmitted in the data stream. Accordingly, it is possible to rebuild a communication from sets of separated packets without accurately knowing when each set of packets was transmitted. Instead, the relative time of transmission can be used to rebuild a communication.

Figure 7:
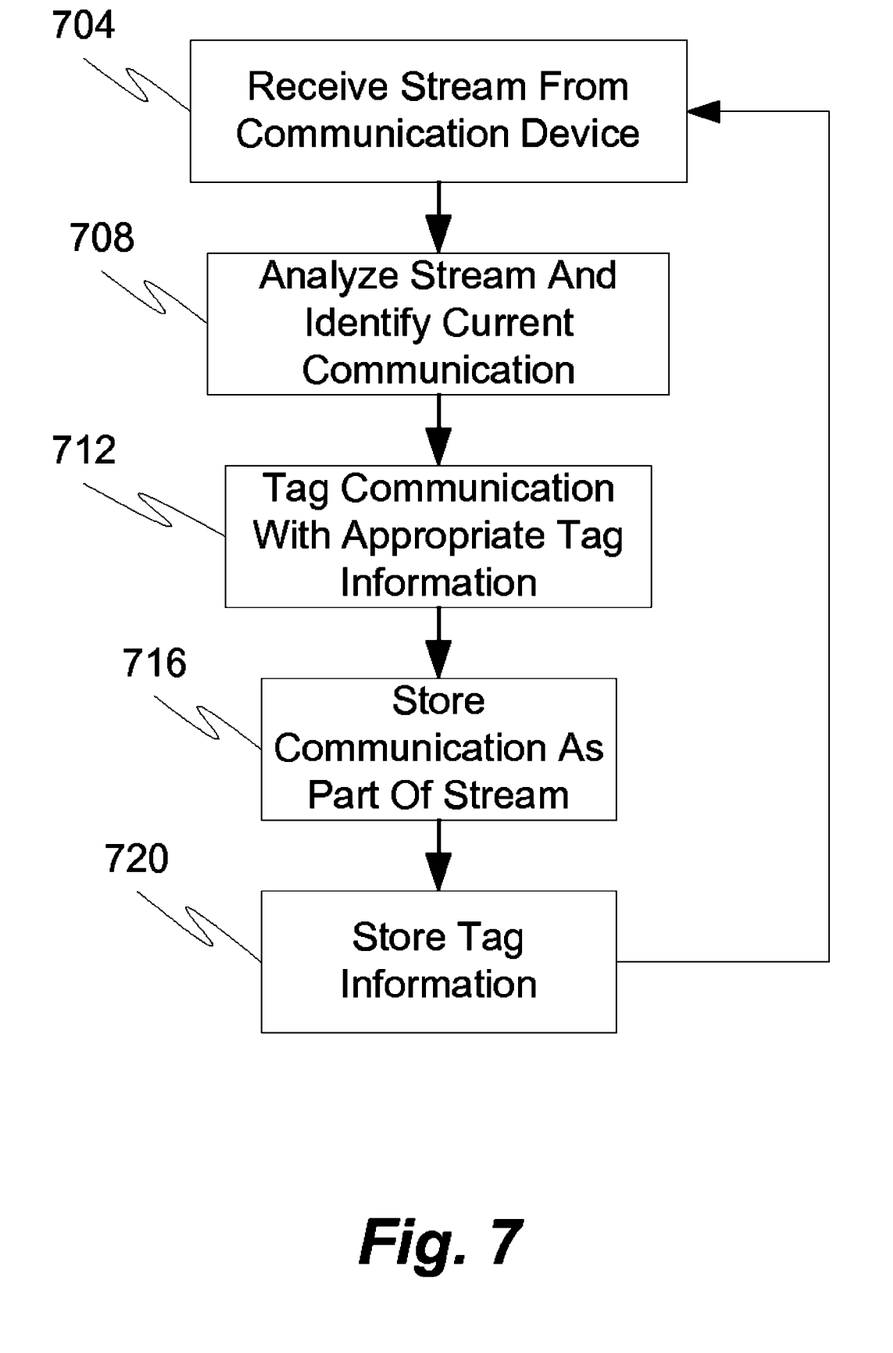
FIG. 7 is a flow diagram depicting an exemplary call recording method in accordance with embodiments of the present invention.

With reference now to FIG. 7, an exemplary communication method will be described in accordance with at least some embodiments of the present invention. The method is initiated when a data stream is received from a communication device at a recording agent 212 (step 704). The received data stream is analyzed to determine an identity of the communication currently being transmitted within the data stream (step 708). This analysis step may include analyzing the sender and intended recipient of the currently transmitted packet of data or sets of packets of data. The analysis step may also include identifying the type of packets, and therefore the communication type, that is currently being transmitted in the data stream. All of this information can be used to determine if the currently transmitted communication is part of a previously analyzed and identified communication or determine if the currently transmitted communication is a new communication that has not yet been identified.

Based on the determination of the communication's properties the communication is tagged with an appropriate tag 616 which identifies some or all of the characteristics revealed during the analysis of the communication (step 712). Thereafter, the communication which has just been analyzed and tagged is stored in the data store 312 as a continuous part of the data stream in contiguous memory (step 716). More specifically, the currently analyzed communication will be stored immediately before the currently analyzed communication and the next communication will be stored immediately after the currently analyzed communication. This allows the entire data stream to be stored in contiguous memory as it was transmitted without any breaks, unless some portions of the data stream were selectively not stored because they were filtered out. It should be noted that some or all of the data within the data store 312 may also be protected by an encryption key for protecting sensitive data stored thereon. The encryption scheme and any keys utilized to encrypt data stored in the data store 312 may be contained within one or more tags of an encrypted communication.

The method continues by storing the tag 616 in the data store 312 (step 720). The tag 616 may be stored as a flag or indicator inserted in the data stream at the beginning of the communication and/or as a separate data entry in the in the data store 312. The unique identifier in the tag may also be stored as the index to the communication (i.e., the unique identifier assigned to the communication may be stored with the communication thereby allowing a processor to find and access the communication after it has been stored as part of the data stream as well as being stored in the tag 616). Thereafter the method returns to step 704 where the process is repeated for the next communication received in the data stream.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA®, or a domain specific language, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for recording call information. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A computer-implemented method, comprising:
receiving a first communication as a part of a media stream;
analyzing the first communication to determine attributes of the first communication;
assigning the first communication a first unique identifier;
receiving a second communication as part of the media stream, wherein the second communication is received immediately after the first communication;
analyzing the second communication to determine attributes of the second communication;
assigning the second communication a second unique identifier different from the first unique identifier;
storing the first and second unique identifiers such that the attributes of the first and second communications are available to be identified in the future;
causing the first and second communications to be recorded in a continuous segment of memory;
receiving a third communication as part of the media stream wherein the third communication is received immediately after the second communication;
analyzing the third communication to determine attributes of the third communication;
assigning the third communication a third unique identifier different from the first and second unique identifiers; and
storing the third and the second unique identifiers, wherein each of the first, second, and third communications comprise a set of packets that were transmitted by a first communication device, wherein the set of packets belonging to the first and second communications were transmitted to a second communication device and wherein the set of packets belonging to the third communication was transmitted to a third communication device and not the second communication device.

2. The method of claim 1, wherein the first and second unique identifiers and the first and second communications are stored in a common data store.

3. The method of claim 1, wherein attributes of the first communication comprise one or more of communication type, length in bytes, time stamp information, and decoding information.

4. The method of claim 3, wherein attributes of the second communication comprise one or more of communication type, length in bytes, time stamp information, and decoding information.

5. The method of claim 1, wherein the second communication comprises real-time media stream transmitted from a first communication device to a second communication device and wherein the first communication comprises call control signals.

6. The method of claim 1, further comprising:
after the first communication has been stored, receiving a request to process the first communication;
retrieving the attributes of the first communication by referencing the first unique identifier;

determining from the attributes a proper method of decoding the first communication;

decoding the first communication; and processing the first communication in accordance with the received request.

7. The method of claim 6, wherein the request to process the first communication comprises a request to replay the recorded version of the first communication.

8. A communication device, comprising:

a recording agent adapted to receive a first communication as a part of a media stream, analyze the first communication to determine attributes of the first communication, assign the first communication a first unique identifier, receive a second communication as part of the media stream, wherein the second communication is received immediately after the first communication, analyze the second communication to determine attributes of the second communication, assign the second communication a second unique identifier different from the first unique identifier, store the first and second unique identifiers such that the attributes of the first and second communications are available to identified in the future, and cause the first and second communications to be recorded in a continuous segment of memory, wherein the recording agent is further adapted to receive a third communication as part of the media stream, wherein the third communication is received immediately after the second communication, analyze the third communication to determine attributes of the third communication, assign the third communication a third unique identifier different from the first and second unique identifiers, and store the third and the second unique identifiers, wherein the recording agent is further adapted to apply a set of filter rules to the third communication, based on the application of the set of filter rules, determine that a portion of the third communication is not of interest, and cause a remaining portion of the third communication to be recorded in the continuous segment of memory immediately after the second communication, wherein the remaining portion of the third communication does not include the portion of the third communication determined not to be of interest, and wherein each of the first, second, and third communications comprise a set of packets that were transmitted by a first communication device, wherein the set of packets belonging to the first and second communications were transmitted to a second communication device and wherein the set of packets belonging to the third communication was transmitted to a third communication device and not the second communication device.

9. The device of claim 8, wherein the first and second unique identifiers and the first and second communications are stored in a common data store that does not reside on the communication device.

10. The device of claim 8, wherein the attributes of the first communication and the attributes of the second communication comprise one or more of communication type, length of the communication in bytes, time stamp information, and decoding information.

11. The device of claim 8, wherein the second communication comprises real-time media stream transmitted from a first communication device to a second communication device and wherein the first communication comprises call control signals.

12. The device of claim 8, wherein, after the first communication has been stored, the recording agent is further adapted to receive a request to process the first communication, retrieve the attributes of the first communication by referencing the first unique identifier, determine from the attributes a proper method of decoding the first communication, decode the first communication, and process the first communication in accordance with the received request.

13. The device of claim 12, wherein the request to process the first communication comprises a request to replay the recorded version of the first communication.

\* \* \* \* \*